United States Patent
Liao et al.

(10) Patent No.: US 8,264,474 B2
(45) Date of Patent: Sep. 11, 2012

(54) MULTI-TOUCH POSITIONING METHOD FOR CAPACITIVE TOUCH PANEL

(75) Inventors: Shih-Chuan Liao, Hsin-Chu (TW); Yu-Min Hsu, Hsin-Chu (TW)

(73) Assignee: Au Optronics Corp., Hsin-Chu (TW)

( * ) Notice: Subject to any disclaimer, the term of this patent is extended or adjusted under 35 U.S.C. 154(b) by 0 days.

(21) Appl. No.: 13/447,557

(22) Filed: Apr. 16, 2012

(65) Prior Publication Data

US 2012/0194475 A1    Aug. 2, 2012

Related U.S. Application Data

(62) Division of application No. 12/396,652, filed on Mar. 3, 2009, now Pat. No. 8,174,509.

(30) Foreign Application Priority Data

Sep. 23, 2008  (TW) .............................. 97136534 A (51) Int. Cl.
*G06F 3/045* (2006.01)

(52) U.S. Cl. ...................................................... 345/174

(58) Field of Classification Search ........... 345/173–174
See application file for complete search history.

(56) References Cited

U.S. PATENT DOCUMENTS

| | | | |
|---|---|---|---|
| 6,392,636 | B1 | 5/2002 | Ferrari et al. |
| 2004/0217945 | A1 | 11/2004 | Miyamoto et al. |
| 2008/0150906 | A1 | 6/2008 | Grivna |
| 2010/0039405 | A1 | 2/2010 | Chen et al. |
| 2010/0066701 | A1 | 3/2010 | Ningrat |

*Primary Examiner* — Joseph Haley
*Assistant Examiner* — Nicholas Lee
(74) *Attorney, Agent, or Firm* — Bacon & Thomas, PLLC (57) ABSTRACT

A multi-touch positioning method for a capacitive touch panel includes following steps. A candidate touching position array including a first and a second candidate position groups is generated when the capacitive touch panel is touched by three objects. The first, the second and the third candidate position groups include three candidate positions, respectively. The signal magnitude sensed by a sensing element and respectively corresponding to the first, the second and the third candidate position groups are compared. One of the three first, the three second and the three third candidate positions are respectively determined as a first, a second and a third actual touching positions according to the compared result.

5 Claims, 9 Drawing Sheets

MULTI-TOUCH POSITIONING METHOD FOR CAPACITIVE TOUCH PANEL

This application is a divisional application of co-pending U.S. application Ser. No. 12/396,652, filed Mar. 3, 2009. This application claims the benefit of Taiwan application Serial No. 97136534, filed Sep. 23, 2008, the subject matter of these applications are incorporated herein by reference.

BACKGROUND OF THE INVENTION

1. Field of the Invention

The invention relates in general to a positioning method, and more particularly to a multi-touch positioning method for a capacitive touch panel.

2. Description of the Related Art

Along with the development of technology, the application of touch panels has become more and more popular. With the disposition of a touch panel in an electronic product, a user can operate the electronic product through directly touching the touch panel. For the user, the disposition of a touch panel in an electronic product improves the convenience in operating the electronic product.

Figure 1:
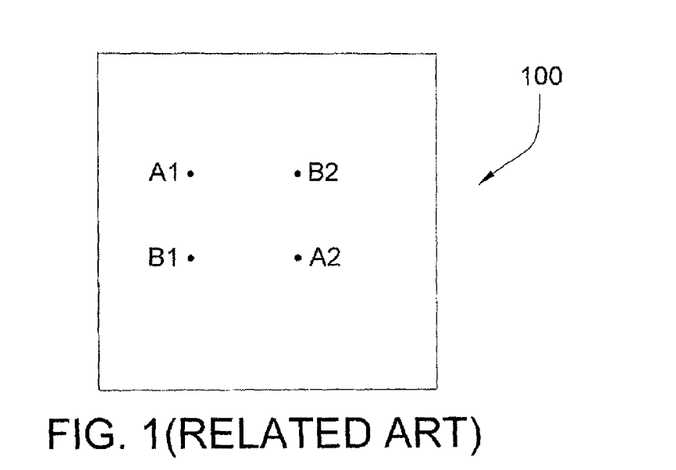
FIG. 1 (Related Art) shows touch positions sensed when two positions of a conventional capacitive touch panel are touched.

Referring to FIG. 1, touch positions sensed when two positions of a conventional capacitive touch panel are touched is shown. When a user touches two positions A1 and A2 on the capacitive touch panel 100 at the same time, the capacitive touch panel 100 determines that the touched positions could be positions A1, A2, B1 and B2 according to the position from which the signals are obtained. However, the capacitive touch panel 100 can not further determine that the actual touched positions are the positions A1 and A2.

The operation of the capacitive touch panel is restricted and brings inconvenience to the user. Thus, how to make the capacitive touch panel be capable of recognizing multi-touch positions so as to improve the application of the capacitive touch panel has become the focus to the manufacturers.

SUMMARY OF THE INVENTION

The invention is directed to a multi-touch positioning method for a capacitive touch panel capable of determining several touched positions of the capacitive touch panel, so that the application of the capacitive touch panel is increased to facilitate the popularization of the capacitive touch panel, and it is more convenient for a user to operation the capacitive touch panel.

According to an embodiment of the present invention, a multi-touch positioning method for a capacitive touch panel is provided. The capacitive touch panel has several first capacitive sensor pads arranged in a matrix and several second capacitive sensor pads arranged in a matrix. The first capacitive sensor pads arranged in the same row along a first direction are electrically connected to one another and coupled to a sensing element. The second capacitive sensor pads arranged in the same row along a second direction are electrically connected to one another and coupled to the sensing element. One of the first capacitive sensor pads is adjacent to at least one of the second capacitive sensor pads. A position is defined by one of the first capacitive sensor pads and one of the second capacitive sensor pads which are adjacent to each other. The method includes following steps. (a) A candidate touching position array is generated correspondingly when the capacitive touch panel is touched by at least two objects, wherein the candidate touching position array includes a first candidate position group and a second candidate position group, the first candidate position group includes at least two first candidate positions arranged along the first direction, and the second candidate position group includes at least two second candidate positions arranged along the first direction. (b1) The signal magnitude which is sensed by the sensing element and corresponds to the first candidate position group is compared with the signal magnitude which is sensed by the sensing element and corresponds to the second candidate position group. (c1) When the signal magnitude corresponding to the first candidate position group is larger than the signal magnitude corresponding to the second candidate position group, one of the two first candidate positions which is closer to the sensing element along the first direction is determined as a first actual touching position, and one of the two second candidate positions which is farther from the sensing element along the first direction is determined as a second actual touching position.

According to another embodiment of the present invention, a multi-touch positioning method for a capacitive touch panel is provided. The capacitive touch panel has several first capacitive sensor pads arranged in a matrix and several second capacitive sensor pads arranged in a matrix. The first capacitive sensor pads arranged in the same row along a first direction are electrically connected to one another and coupled to a sensing element. The second capacitive sensor pads arranged in the same row along a second direction are electrically connected to one another and coupled to the sensing element. One of the first capacitive sensor pads is adjacent to at least one of the second capacitive sensor pads. A position is defined by one of the first capacitive sensor pads and one of the second capacitive sensor pads which are adjacent to each other. The method includes following steps. (a) A candidate touching position array is generated correspondingly when the capacitive touch panel is touched by at least three objects, wherein the candidate touching position array includes a first candidate position group, a second candidate position group and a third candidate position group, the first candidate position group includes at least three first candidate positions arranged along the first direction, the second candidate position group includes at least three second candidate positions arranged along the first direction, and the third candidate position group includes at least three third candidate positions arranged along the first direction. (b1) The signal magnitude which is sensed by the sensing element and corresponds to the first candidate position group, the signal magnitude which is sensed by the sensing element and corresponds to the second candidate position group, and the signal magnitude which is sensed by the sensing element and corresponds to the third candidate position group are compared. (c1) When the signal magnitude corresponding to the first candidate position group is larger than the signal magnitude corresponding to the second candidate position group and the signal magnitude corresponding to the second candidate position group is larger than the signal magnitude corresponding to the third candidate position group, one of the three first candidate positions which is closest to the sensing element along the first direction is determined as a first actual touching position, one of the three second candidate positions which is located between the second candidate position closest to the sensing element and the second candidate position farthest from the sensing element along the first direction is determined as a second actual touching position, and one of the three third candidate positions which is farthest from the sensing element along the first direction is determined as a third actual touching position.

The invention will become apparent from the following detailed description of the preferred but non-limiting embodiments. The following description is made with reference to the accompanying drawings.

DETAILED DESCRIPTION OF THE INVENTION

The invention provides a multi-touch positioning method for a capacitive touch panel. The invention is exemplified by a first embodiment and a second embodiment below. However, the first embodiment and the second embodiment are for elaboration only not for limiting the scope of the invention.

First Embodiment

Figure 2:
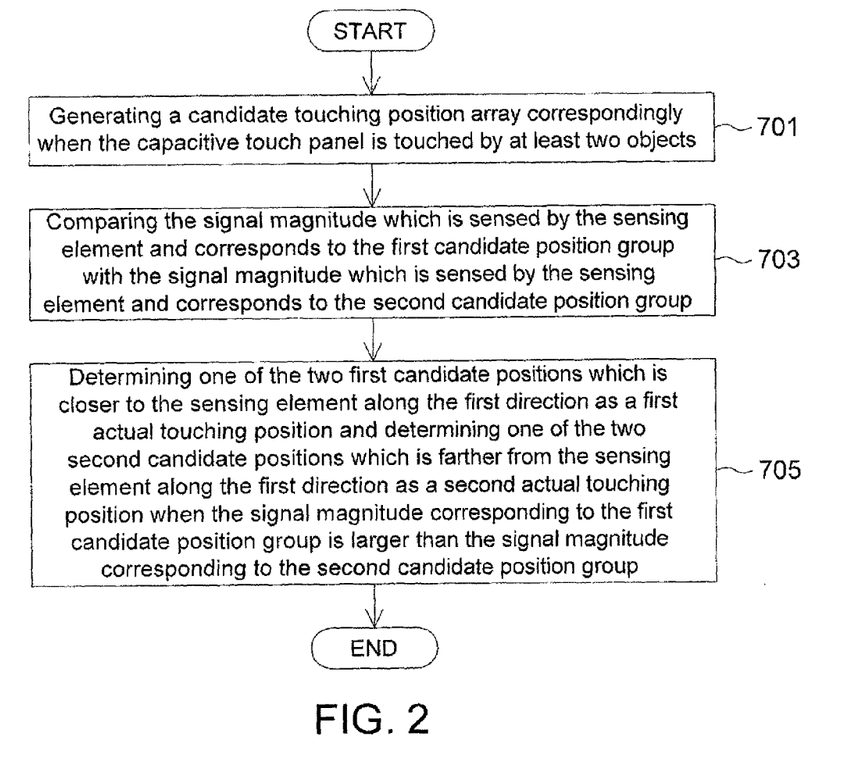
FIG. 2 shows a flowchart of a multi-touch positioning method according to a first embodiment of the invention.
Figure 3:
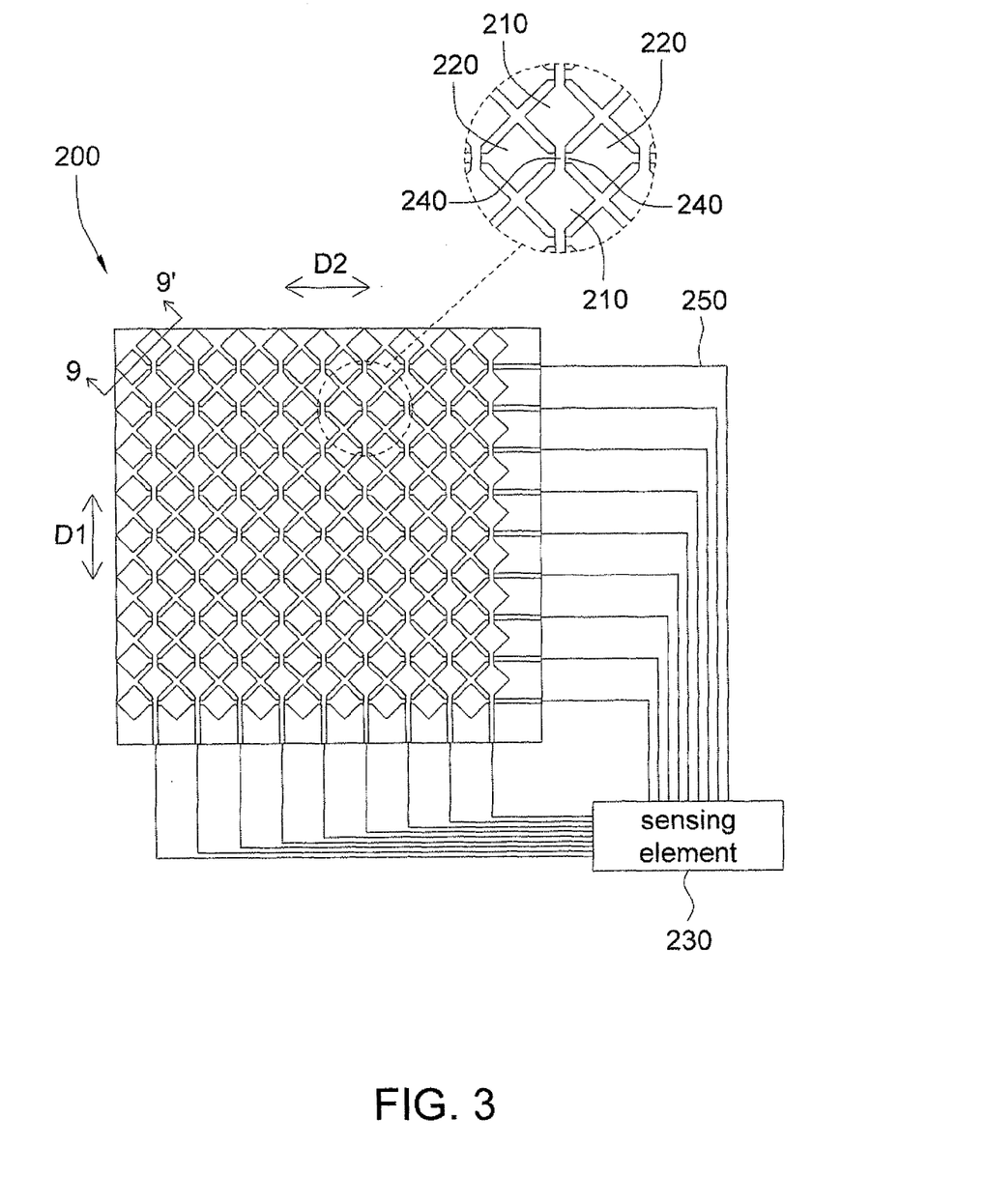
FIG. 3 shows an example of a capacitive touch panel used in the positioning method according to the invention.

Referring to FIG. 2 and FIG. 3, a flowchart of a multi-touch positioning method according to a first embodiment of the invention is shown in FIG. 2, and an example of a capacitive touch panel used in the positioning method according to the invention is shown in FIG. 3. The positioning method is illustrated by being applied to the capacitive touch panel 200 in FIG. 3.

In FIG. 3, the capacitive touch panel 200 has several first capacitive sensor pads 210 arranged in a matrix and several second capacitive sensor pads 220 arranged in a matrix. The first capacitive sensor pads 210 arranged in the same row along a first direction D1 are electrically connected to one another and coupled to a sensing element 230. The second capacitive sensor pads 220 arranged in the same row along a second direction D2 are electrically connected to one another and coupled to the sensing element 230. One of the first capacitive sensor pads 210 is adjacent to at least one of the second capacitive sensor pads 220. A position is defined by one of the first capacitive sensor pads 210 and one of the second capacitive sensor pads 220 which are adjacent to each other.

Figure 4:
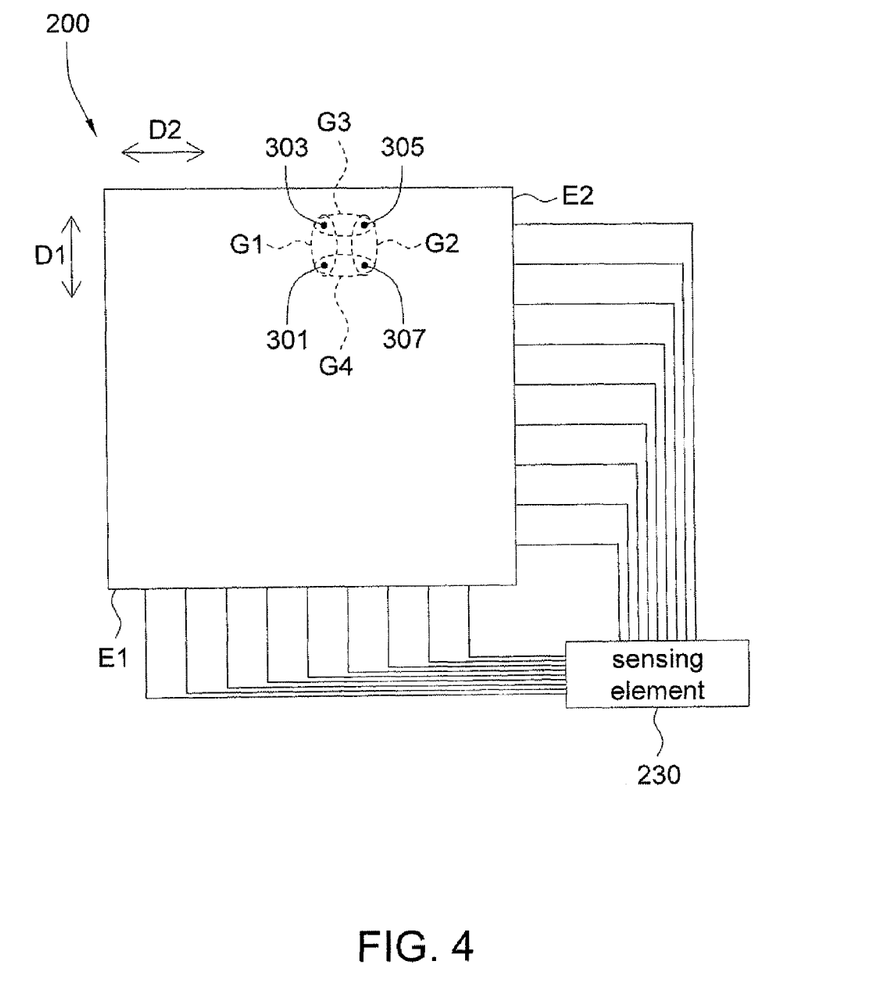
FIG. 4 shows an example of a candidate touching position array generated in the step 701 in FIG. 2.

The positioning method in FIG. 2 includes following steps. Firstly, in the step 701, when the capacitive touch panel 200 is touched by two objects (such as a user's fingers), a candidate touching position array as indicated in FIG. 4 is generated correspondingly. Referring to FIG. 4, an example of a candidate touching position array generated in the step 701 in FIG. 2 is shown. For simplification, the first capacitive sensor pads 210 and the second capacitive sensor pads 220 are not illustrated in FIG. 4. As shown in FIG. 4, the candidate touching position array includes a first candidate position group G1 and a second candidate position group G2. The first candidate position group G1 includes two first candidate positions 301 and 303 arranged along the first direction D1, and the second candidate position group G2 includes two second candidate positions 305 and 307 arranged along the first direction D1.

Next, in the step 703, the signal magnitude which is sensed by the sensing element 230 and corresponds to the first candidate position group G1 is compared with the signal magnitude which is sensed by the sensing element 230 and corresponds to the second candidate position group G2.

As the distance between the touched position and the sensing element is inversely correlated with the signal magnitude corresponding to the touched position, actual touching positions are determined in the step 705 according to the above relationship. In the step 705, when the signal magnitude corresponding to the first candidate position group G1 is larger than the signal magnitude corresponding to the second candidate position group G2, one of the two first candidate positions 301 and 303 which is closer to the sensing element 230 along the first direction D1 is determined as a first actual touching position, and one of the two second candidate positions 305 and 307 which is farther from the sensing element 230 along the first direction D1 is determined as a second actual touching position. As indicated in FIG. 4, compared with the first candidate position 303, the first candidate position 301 is closer to the sensing element 230 along the first direction D1, and compared with the second candidate position 307, the second candidate position 305 is farther from the sensing element 230 along the first direction D1. Thus, in the present embodiment of the invention, the first candidate position 301 is the first actual touching position, and the second candidate position 305 is the second actual touching position.

Thus, when two or even more positions on the capacitive touch panel are touched by a user, the capacitive touch panel using the positioning method according to the present embodiment of the invention can sense the touched positions, hence having a diversified range of application.

The positioning method according to the present embodiment of the invention is further elaborated below. As indicated in FIG. 4, the capacitive touch panel 200 has a first edge E1 and a second edge E2 substantially perpendicular to the first edge E1. The first direction D1 is substantially perpendicular to the second direction D2. The first edge E1 is substantially perpendicular to the first direction D1. The second edge E2 is substantially perpendicular to the second direction D2. For example, in the step 705, which one of the first candidate positions 301 and 303 is closer to the sensing element 230 is determined according to the distance between each of the first candidate positions 301 and 303 and the first edge E1 in the first direction D1, and which one of the second candidate positions 305 and 307 is closer to the sensing element 230 is determined according to the distance between each of the second candidate positions 305 and 307 and the first edge E1 in the first direction D1.

According to the positioning method in FIG. 2, the signal magnitudes corresponding to the first candidate position group G1 and the second candidate position group G2 of the candidate touching position array are compared so as to determine the actual touching positions. However, anyone who is skilled in the related art of the invention will understand that according to the positioning method in FIG. 2, the signal magnitudes corresponding to a third candidate position group G3 and a fourth candidate position group G4 of the candidate touching position array can also be compared so as to determine the actual touching positions. Besides, the results obtained in the step 705 in FIG. 2 can also be verified by the signal magnitudes corresponding to the third candidate position group G3 and the fourth candidate position group G4. The positions of the third candidate position group G3 and the fourth candidate position group G4 are indicated in FIG. 4. The third candidate position group G3 includes two third candidate positions arranged along the second direction D2. The two third candidate positions include the first candidate position 303 and the second candidate position 305. The fourth candidate position group G4 includes two fourth candidate positions arranged along the second direction D2. The two fourth candidate positions include the other first candidate position 301 and the other second candidate position 307.

Figure 5:
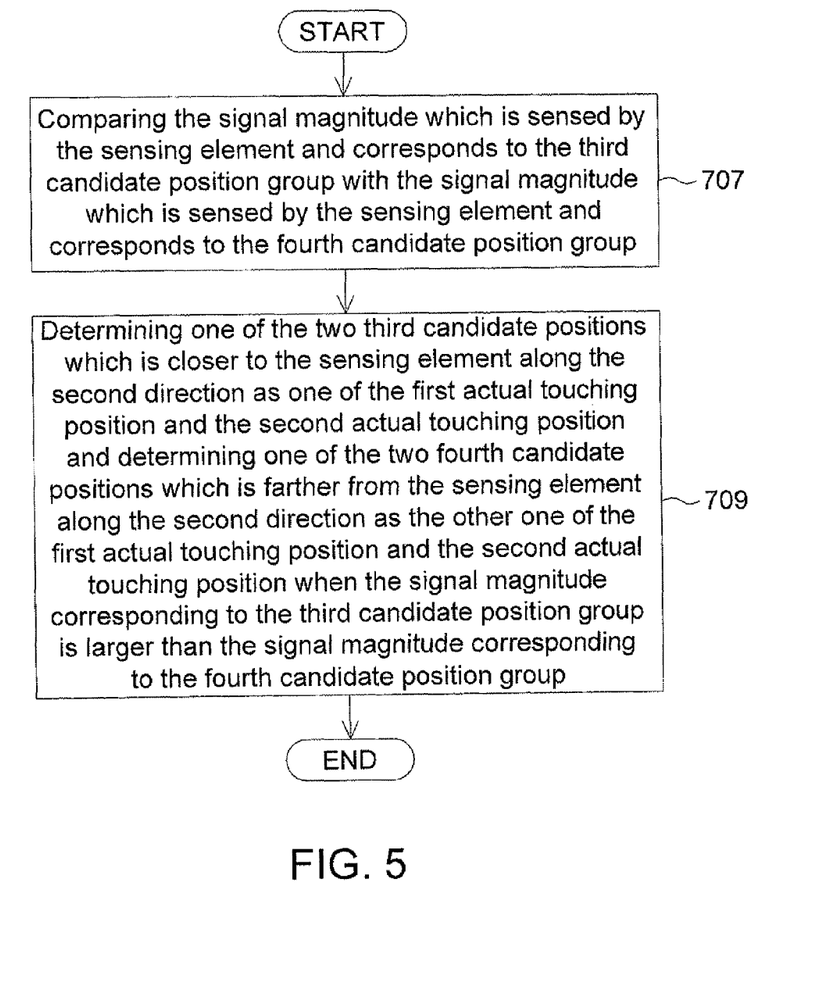
FIG. 5 shows a flowchart of verifying the results obtained in the step 705 in FIG. 2.

The process of verifying the results obtained in the step 705 in FIG. 2 is shown in FIG. 5. However, the positioning method according to the present embodiment of the invention does not have to execute the steps in FIG. 5. In the step 707 in FIG. 5, the signal magnitude which is sensed by the sensing element 230 and corresponds to the third candidate position group G3 is compared with the signal magnitude which is sensed by the sensing element 230 and corresponds to the fourth candidate position group G4.

In the step 709, when the signal magnitude corresponding to the third candidate position group G3 is larger than the signal magnitude corresponding to the fourth candidate position group G4, one of the two third candidate positions (that is, the candidate position numbered with 305) which is closer to the sensing element 230 along the second direction D2 is determined as one of the first actual touching position and the second actual touching position, and one of the two fourth candidate position (that is, the candidate position numbered with 301) which is farther from the sensing element 230 along the second direction D2 is determined as the other one of the first actual touching position and the second actual touching position so as to reconfirm the results obtained in the step 705 in FIG. 2.

In the step 709, which one of the third candidate positions is closer to the sensing element 230 is determined according to the distance between each of the third candidate positions and the second edge E2 in the second direction D2, and which one of the fourth candidate positions is closer to the sensing element 230 is determined according to the distance between each of the fourth candidate positions and the second edge E2 in the second direction D2, for example.

Figure 9:
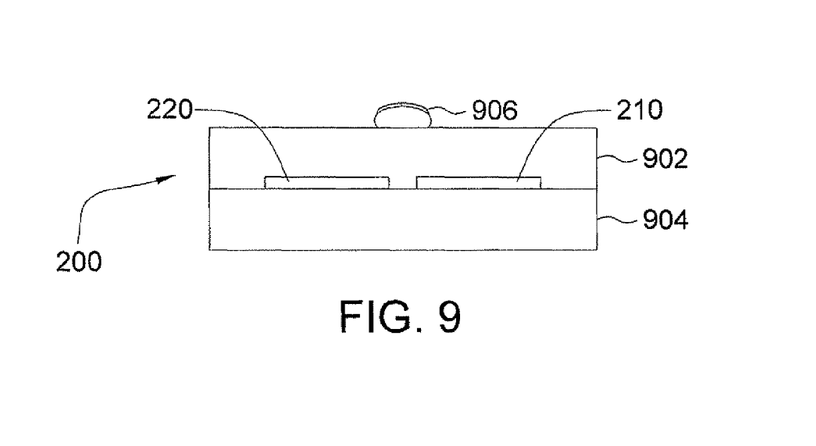
FIG. 9 shows an example of a sectional view of the capacitive touch panel in FIG. 3 along a cross-sectional line 9-9'.

Referring to FIG. 9, an example of a sectional view of the capacitive touch panel in FIG. 3 along a cross-sectional line 9-9' is shown. The first capacitive sensor pad 210 and the second capacitive sensor pad 220 are disposed between two substrates 902 and 904. The two substrates 902 and 904 are exemplified by glass substrates. When the capacitive touch panel 200 is touched by a finger 906, the equivalent capacitance between the first capacitive sensor pad 210 and its adjacent second capacitive sensor pads 220 will be changed. A difference is between the equivalent capacitance before and after the capacitive touch panel 200 is touched. The signal magnitude of the signal received by the sensing element 230 will reflect the difference to be used as a basis for determining whether the capacitive touch panel 200 is touched.

Figure 10:
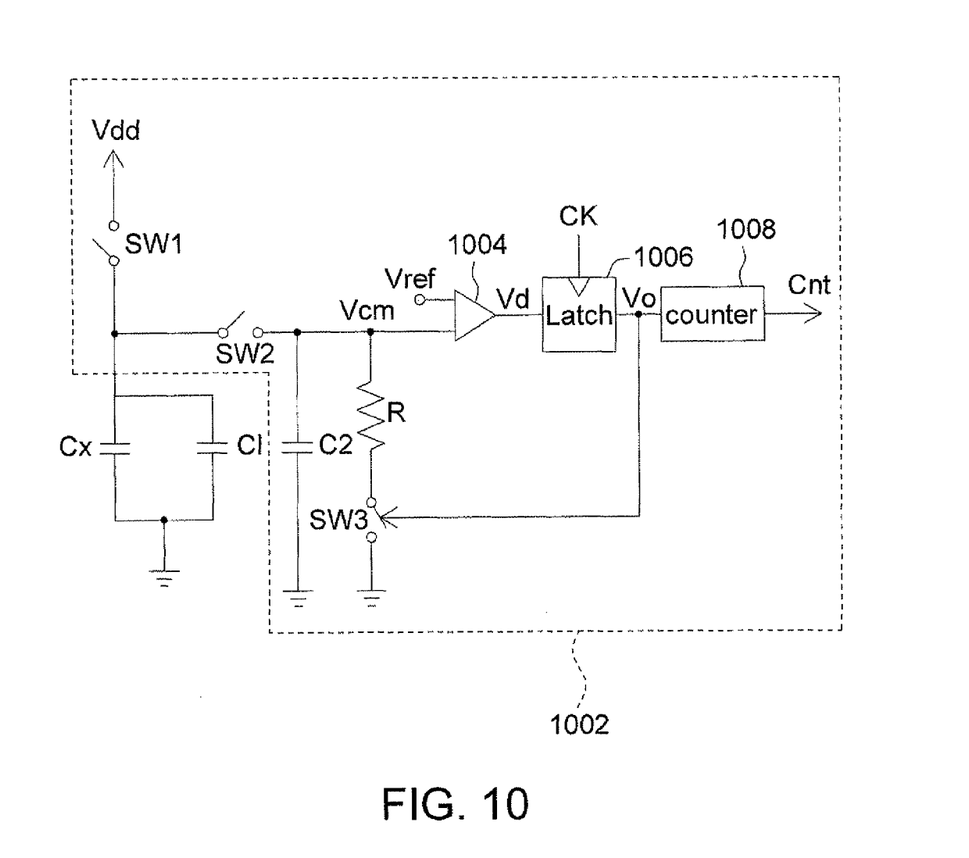
FIG. 10 shows an example of a sensing circuit used by the sensing element in FIG. 3.

Referring to FIG. 10, an example of a sensing circuit 1002 used by the sensing element 230 in FIG. 3 is shown. Let the second capacitive sensor pads 220 arranged in the first row in FIG. 3 be taken as an example. The second capacitive sensor pads 220 arranged in the first row are electrically connected to the sensing element 230 through a sensing wire 250. Suppose the equivalent capacitor corresponding to all of the second capacitive sensor pads 220 arranged in the first row is C1 before the capacitive touch panel is touched by a finger, and the equivalent capacitor corresponding to all of the second capacitive sensor pads 220 arranged in the first row is C1 and Cx coupled in parallel after the capacitive touch panel is touched by a finger. The sensing circuit 1002 includes switches SW1~SW3, a capacitor C2, a resistor R, a comparator 1004, a latch 1006, and a counter 1008. The periods that the switches SW1 and SW2 are turned on are not overlapped. When the switch SW1 is turned on, the capacitors C1 and Cx are charged. Afterwards, the switch SW2 is turned on, the capacitors C1 and Cx will charge the capacitor C2. When the terminal voltage Vcm of the capacitor C2 is larger than the reference voltage Vref, the output voltage Vd of the comparator 1004 is a positive voltage. When the clock signal CK is changed to be at high level, the latch 1006 samples the output voltage Vd and correspondingly outputs the voltage V0. When the sampled output voltage Vd is a positive voltage, the voltage V0 is at high level and maintains for a clock period with one clock signal CK. In addition, when Vcm is larger than the reference voltage Vref, the switch SW3 is turned on, so that the capacitor C2 is discharged through the resistor R, or the switch SW3 will not be turned on. The counter 1008 counts the number of clock periods when the voltage V0 is at high level and outputs a count Cnt. As the sensing element 230 scans the second capacitive sensor pads row by row, the count Cnt preferably is a count generated within a sensing period when the second capacitive sensor pads arranged in one row are sensed. The value of the capacitor Cx is obtained according to the value of the count Cnt. The signal magnitude is correlated with the count Cnt. For example, the larger the count Cnt, the larger the signal magnitude.

The counter 1008 can be implemented by way of hardware or software.

However, the invention can also calculate the value of the capacitor Cx with other sensing circuits as long as any parameter of an electrical signal outputted by the sensing circuit is correlated with the capacitor Cx. For example, the capacitor Cx or the combination of the capacitors Cx and C1 which is correlated with the output voltage, the output frequency, or the output power of the sensing circuit can be applied to the invention.

In addition, one of the reasons why the distance between the touched position and the sensing element 230 is inversely correlated with the signal magnitude corresponding to the touched position is that when the touched position is far away from the sensing element 230, the transmission path for the signal to be transmitted to the sensing element 230 is longer and the equivalent resistance of the transmission path when the signal is transmitted is larger, so the signal magnitude will be diminished. In order to let the sensing element 230 have better sensing effect, the difference between the signal magnitudes generated when different positions are touched can be increased by changing the equivalent resistance corresponding to the different positions.

As shown in FIG. 3, in the step 701, the sensing element 230 senses the signal corresponding to the first candidate position group G1 through the first capacitive sensor pads 210 and connectors 240 arranged in the same row of the capacitive touch panel 200. The connectors 240 are connected between two adjacent first capacitive sensor pads 210. In order to increase the difference between the signal magnitudes corresponding to different positions for precisely determining the touched position, the resistances of the first capacitive sensor pads 210 and the connectors 240 at different positions are different. Therefore, the difference between the signal magnitudes corresponding to different positions is increased to facilitate the determination of the sensing element 230.

For example, of the first capacitive sensor pads 210 and/or the connectors 240 arranged in the same row along the first direction D1, the resistances of the first capacitive sensor pads 210 and the connectors 240 which is closer to the sensing element 230 is smaller than that farther from the sensing element 230. Thus, along the first direction D1, the difference between the signal magnitude corresponding to the first capacitive sensor pad closer to the sensing element 230 and the signal magnitude corresponding to the first capacitive sensor pad farther from the sensing element 230 is even increased. The resistance of the first capacitive sensor pad can be adjusted by changing at least one of the area and the thickness of the first capacitive sensor pad. The resistance of the connector 240 can be adjusted by changing the area of the cross section of the connector 240 (for example, the width of the connector 240). Furthermore, the resistance of the second capacitive sensor pad can also be changed in the same way so as to increase the accuracy in determination.

Figure 11:
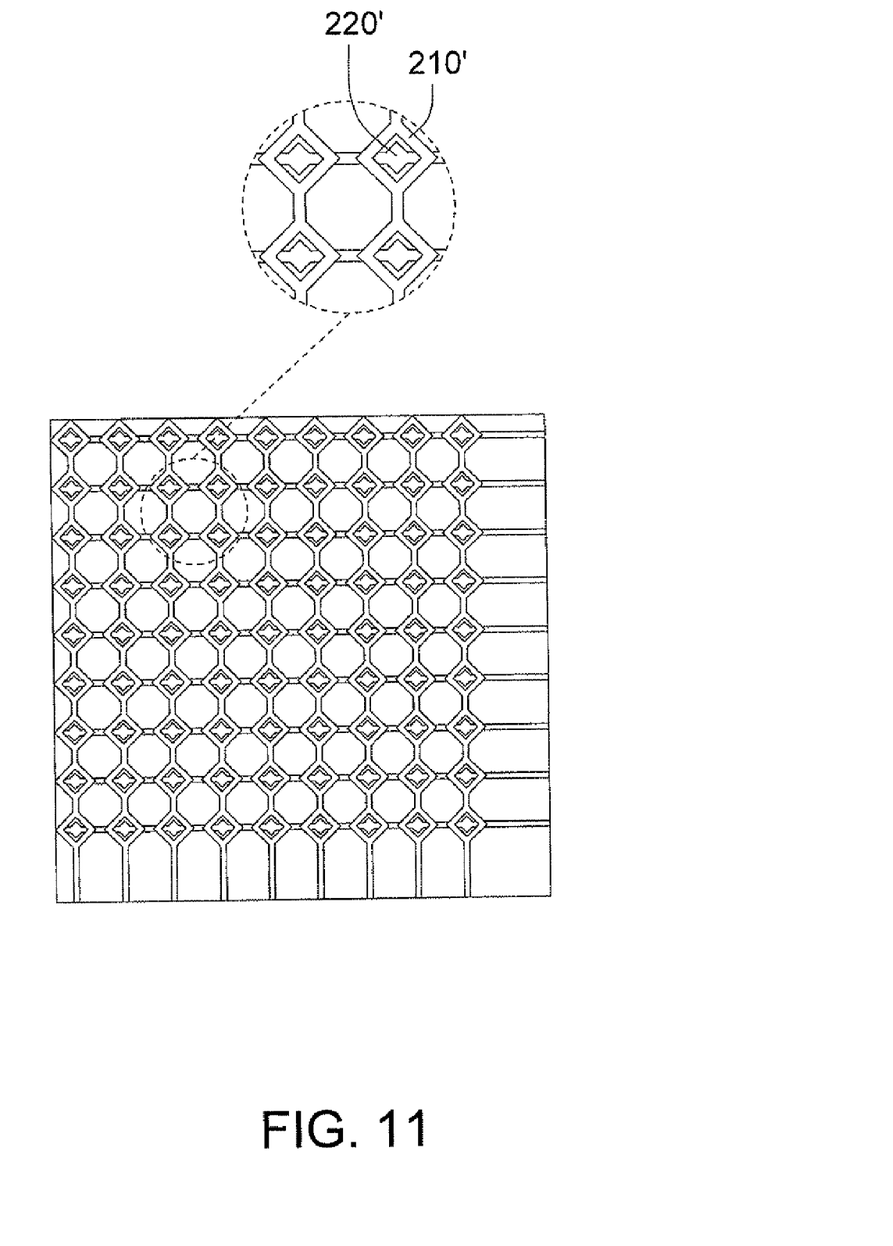
FIG. 11 shows another capacitive touch panel used for performing the positioning method according to the invention.

The shape of the pad used in the capacitive touch panel of the present embodiment of the invention is not limited to a quadrangle as shown in FIG. 3. Other shapes such as a hexagon, a triangle, or an octagon can also be used as the shape of the pad used in the capacitive touch panel. Referring to FIG. 11, another capacitive touch panel used for performing the positioning method according to the invention is shown. The first capacitive sensor pads can be loop-shaped such as pads 210' in FIG. 11, and the second capacitive sensor pads can be pads 220' disposed in the loop-shaped pads 210'. Besides, the second capacitive sensor pads can also be loop-shaped pads, and the first capacitive sensor pads can also be pads disposed in the loop-shaped pads.

The positioning method of the present embodiment is for determining multi-touch positions of the capacitive touch panel. The positioning method determines the actual touching positions according to the signal magnitudes of several candidate position groups as well as the distances between each of the candidate positions of the candidate position groups and the sensing element. Thus, the positioning method of the present embodiment can determine several actual touching positions without adjusting or changing the components of the capacitive touch panel, so that the application of the capacitive touch panel using the positioning method of the present embodiment is even diversified.

Second Embodiment

Figure 6:
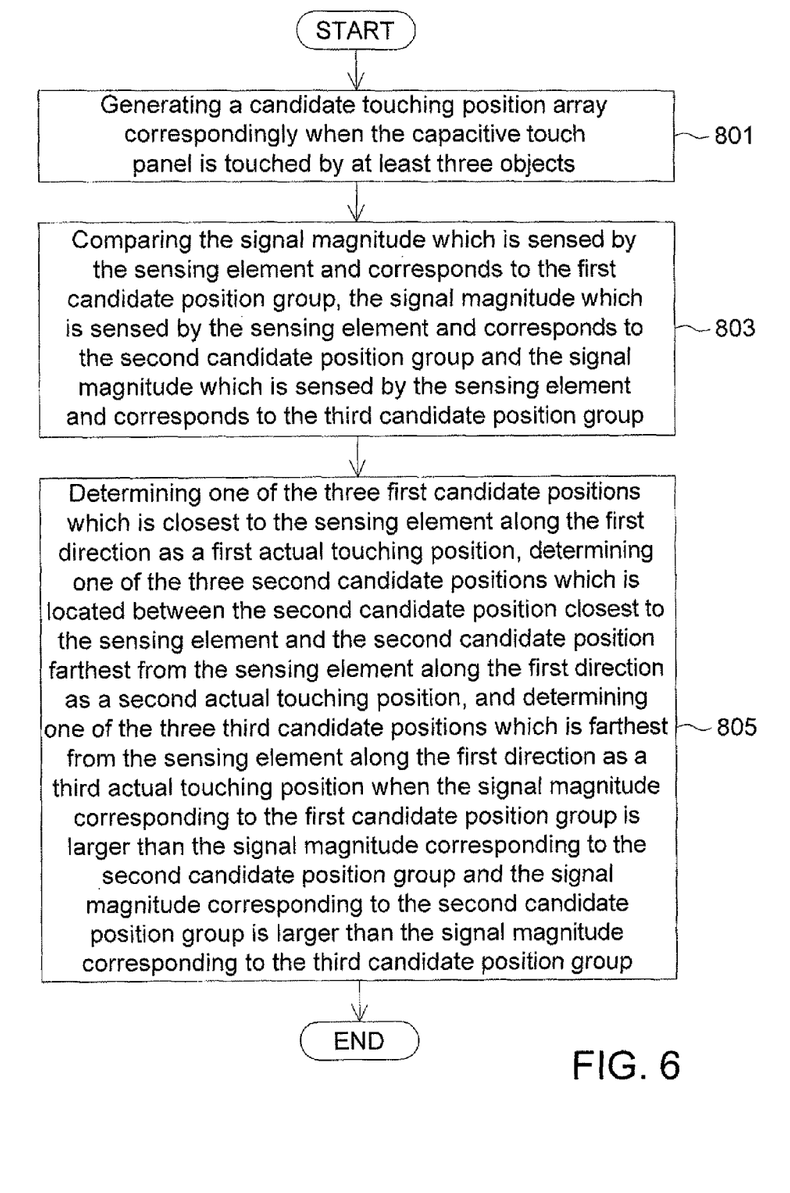
FIG. 6 shows a flowchart of a multi-touch positioning method according to a second embodiment of the invention.

The positioning method of the present embodiment differs from the positioning method of the first embodiment in the determined number of touched positions of the capacitive touch panel. Referring to FIG. 6, a flowchart of a multi-touch positioning method according to a second embodiment of the invention is shown. The present embodiment of the invention is exemplified by applying the positioning method to the capacitive touch panel 200 in FIG. 3. However, the application of the positioning method of the present embodiment is not limited to the capacitive touch panel 200.

Figure 7:
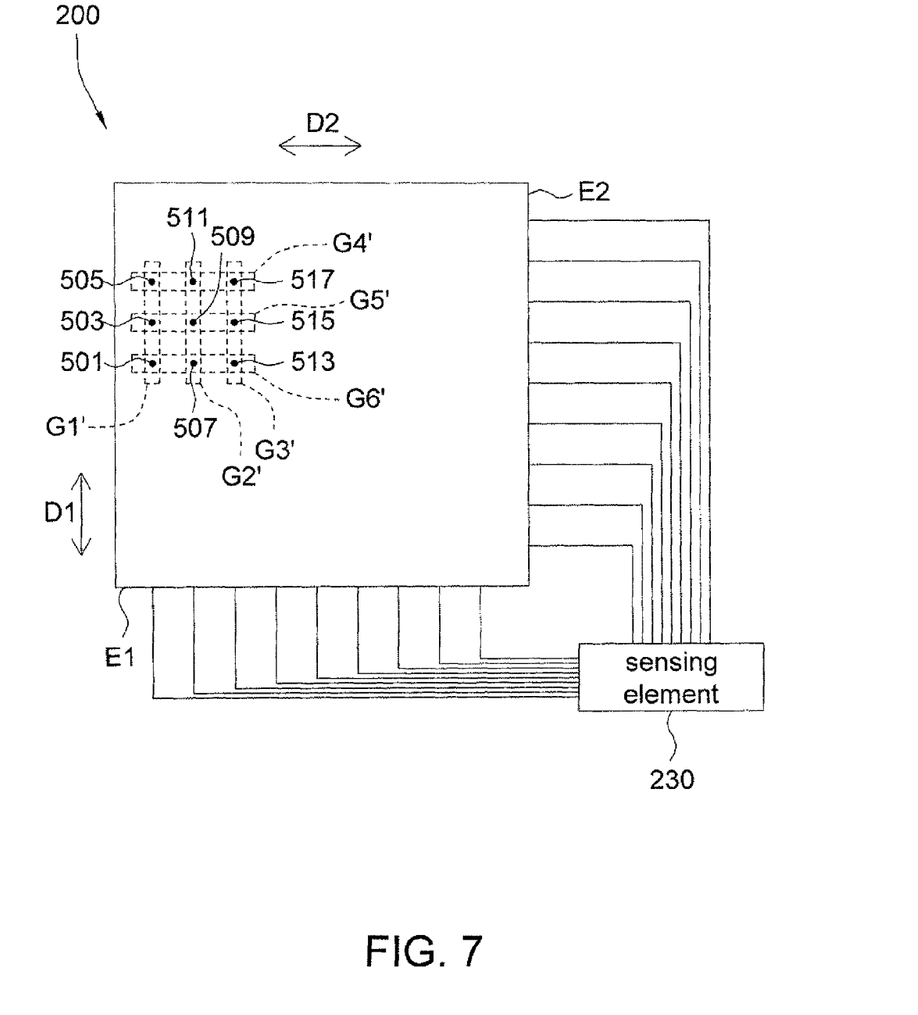
FIG. 7 shows an example of a candidate touching position array generated in the step 801 in FIG. 6.

The steps 801 and 803 in FIG. 6 are different from the steps 701 and 703 in FIG. 2 in the number of touched positions, and the similarities are not repeated here. Referring to FIG. 7, an example of a candidate touching position array generated in the step 801 in FIG. 6 is shown. For simplification, the first capacitive sensor pads 210 and the second capacitive sensor pads 220 of the capacitive touch panel 200 are not illustrated in FIG. 7. In the step 803, the signal magnitudes of the first candidate position group G1', the second candidate position group G2' and the third candidate position group G3' of the candidate touching position array sensed by the sensing element 230 and respectively correspond to the first candidate position group G1', the second candidate position group G2' and the third candidate position group G3' are compared.

Then, the step 805 is executed after the step 803. In the step 805, when the signal magnitude corresponding to the first candidate position group G1' is larger than the signal magnitude corresponding to the second candidate position group G2' and the signal magnitude corresponding to the second candidate position group G2' is larger than the signal magnitude corresponding to the third candidate position group G3', one of the three first candidate positions 501, 503 and 505 closest to the sensing element 230 along the first direction D1 is determined as a first actual touching position, one of the three second candidate positions 507, 509 and 511 along the first direction D1 located between the second candidate position closest to the sensing element 230 and the second candidate position farthest from the sensing element 230 is determined as a second actual touching position, and one of the three third candidate positions 513, 515 and 517 farthest from the sensing element 230 along the first direction D1 is determined as a third actual touching position. As indicated in FIG. 7, compared with the first candidate positions 503 and 505, the first candidate position 501 is closest to the sensing element 230 along the first direction D1. Compared with the second candidate positions 507 and 511, the second candidate position 509 is located between the second candidate position (the second candidate position 507) closest to the sensing element 230 and the second candidate position (the second candidate position 511) farthest from the sensing element 230 along the first direction D1. Compared with the third candidate positions 513 and 515, the third candidate position 517 is farthest from the sensing element 230 along the first direction D1. Thus, the first candidate position 501 is the first actual touching position, the second candidate position 509 is the second actual touching position, and the third candidate position 517 is the third actual touching position.

In the step 805 of the present embodiment, according to the distance between each of the first candidate positions and the first edge E1 in the first direction D1, which one of the first candidate positions is closer to or farther from the sensing element 230 or is located between the first candidate position closest to the sensing element 230 and the first candidate position farthest from the sensing element 230 is determined. According to the distance between each of the second candidate positions and the first edge E1 in the first direction D1, which one of the second candidate positions is closer to or farther from the sensing element 230 or is located between the second candidate position closest to the sensing element 230 and the second candidate position farthest from the sensing element 230 is determined. According to the distance between each of the third candidate positions and the first edge E1 in the first direction D1, which one of the third candidate positions is closer to or farther from the sensing element 230 or is located between the third candidate position closest to the sensing element 230 and the third candidate position farthest from the sensing element 230 is determined.

Furthermore, the results obtained according to the positioning method of the present embodiment in FIG. 6 can be verified by the signal magnitudes of the fourth candidate position group G4', the fifth candidate position group G5' and the sixth candidate position group G6' in FIG. 7. The fourth candidate position group G4', the fifth candidate position group G5' and the sixth candidate position group G6' are indicated in FIG. 7. The fourth candidate position group G4' includes three fourth candidate positions arranged in the same row along the second direction D2. The three fourth candidate positions include one first candidate position 505, one second candidate position 511 and one third candidate position 517. The fifth candidate position group G5' includes three fifth candidate positions arranged in the same row along the second direction D2. The three fifth candidate positions include another first candidate position 503, another second candidate position 509 and another third candidate position 515. The sixth candidate position group G6' includes three sixth candidate positions arranged in the same row along the second direction D2. The three sixth candidate positions includes the other first candidate position 501, the other second candidate position 507 and the other third candidate position 513. The first direction D1 is, for example, substantially perpendicular to the second direction D2.

Figure 8:
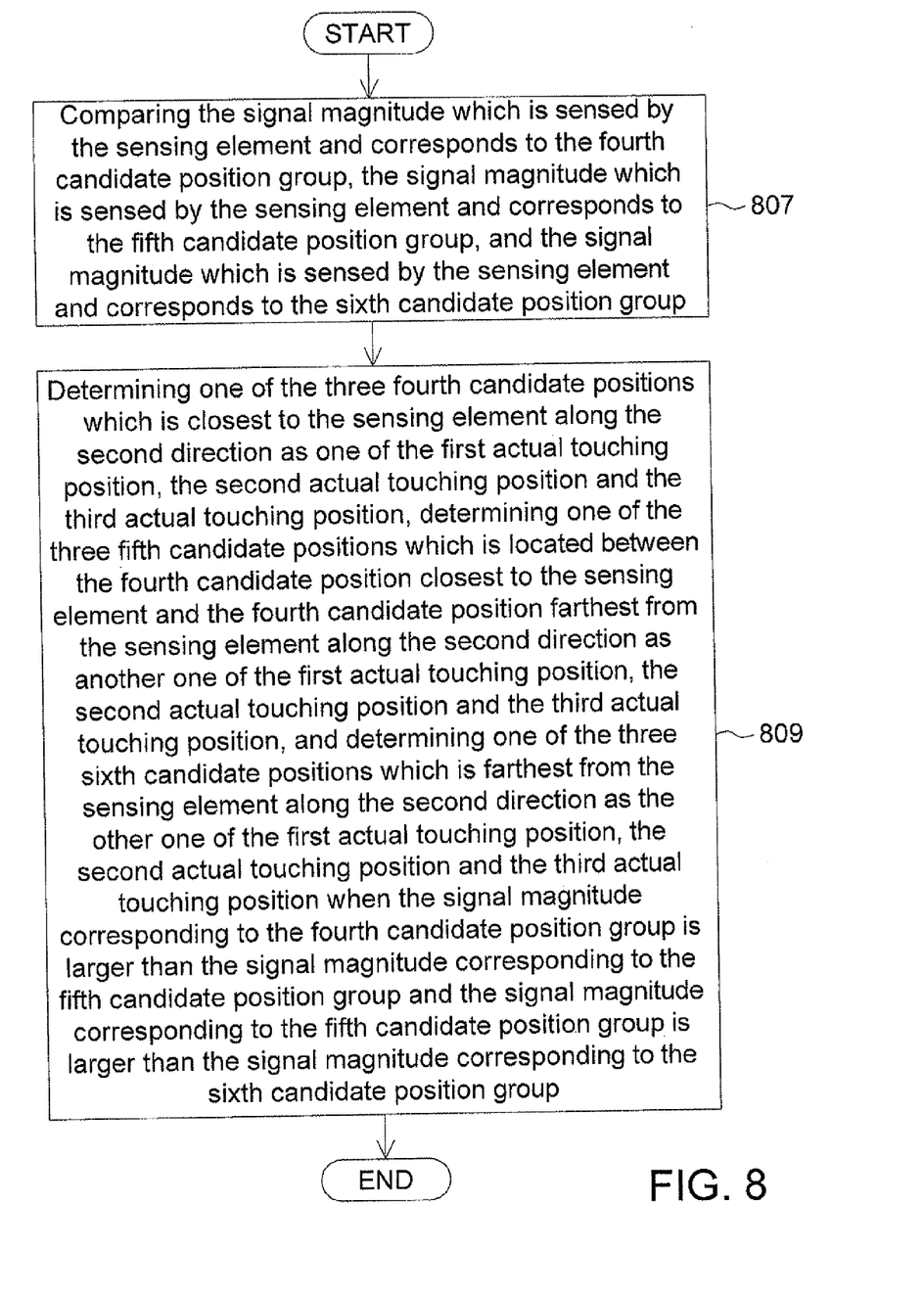
FIG. 8 shows a flowchart of verifying the results obtained in the step 805 in FIG. 6.

The results obtained in the step 805 in FIG. 6 are further verified by the steps shown in FIG. 8. However, the positioning method of the present embodiment of the invention does not have to execute the steps in FIG. 8. In the step 807 in FIG. 8, the signal magnitudes sensed by the sensing element 230 and respectively correspond to the fourth candidate position group G4', the fifth candidate position group G5', and the sixth candidate position group G6' are compared.

In the step 809, when the signal magnitude corresponding to the fourth candidate position group G4' is larger than the signal magnitude corresponding to the fifth candidate position group G5' and the signal magnitude corresponding to the fifth candidate position group G5' is larger than the signal magnitude corresponding to the sixth candidate position group G6', one of the three fourth candidate positions (that is, the candidate position numbered with 517) closest to the sensing element 230 along the second direction D2 is determined as one of the first actual touching position, the second actual touching position and the third actual touching position. Besides, one of the three fifth candidate positions located between the fifth candidate position closest to the sensing element 230 and the fifth candidate position farthest from the sensing element 230 along the second direction D2 (that is, the candidate position numbered with 509) is determined as another one of the first actual touching position, the second actual touching position and the third actual touching position. Furthermore, one of the three sixth candidate positions along the second direction D2 farthest from the sensing element 230 (that is, the candidate position numbered with 501) is determined as the other one of the first actual touching position, the second actual touching position and the third actual touching position. Therefore, the results obtained in the step 805 in FIG. 6 are reconfirmed.

In the step 809, according to the distance between each of the fourth candidate positions and the second edge E2 in the second direction D2, which one of the fourth candidate positions is closer to or farther from the sensing element 230 or is located between the fourth candidate position closest to the sensing element 230 and the fourth candidate position farthest from the sensing element 230 is determined. According to the distance between each of the fifth candidate positions and the second edge E2 in the second direction D2, which one of the fifth candidate positions is closer to or farther from the sensing element 230 or is located between the fifth candidate position closest to the sensing element 230 and the fifth candidate position farthest from the sensing element 230 is determined. According to the distance between each of the sixth candidate positions and the second edge E2 in the second direction D2, which one of the sixth candidate positions is closer to or farther from the sensing element 230 or is located between the sixth candidate position closest to the sensing element 230 and the sixth candidate position farthest from the sensing element 230 is determined.

According to the multi-touch positioning method for the capacitive touch panel disclosed in the above embodiments of the invention, the signal magnitudes of several candidate position groups and the distances between each of the candidate positions of the candidate position groups and the sensing element are used as a basis for determining actual touching positions. Thus, the positioning method of the embodiments does not need to change the components of the capacitive touch panel, so that the application of the capacitive touch panel is even diversified without incurring extra cost.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A multi-touch positioning method for a capacitive touch panel, wherein the capacitive touch panel has a plurality of first capacitive sensor pads arranged in a matrix and a plurality of second capacitive sensor pads arranged in a matrix, the first capacitive sensor pads arranged in the same row along a first direction are electrically connected to one another and coupled to a sensing element, the second capacitive sensor pads arranged in the same row along a second direction are electrically connected to one another and coupled to the sensing element, one of the first capacitive sensor pads is adjacent to at least one of the second capacitive sensor pads, a position is defined by one of the first capacitive sensor pads and one of the second capacitive sensor pads which are adjacent to each other, and the method comprises:

(a) generating a candidate touching position array correspondingly when the capacitive touch panel is touched by at least three objects, wherein the candidate touching position array comprises a first candidate position group, a second candidate position group and a third candidate position group, the first candidate position group comprises at least three first candidate positions arranged along the first direction, the second candidate position group comprises at least three second candidate positions arranged along the first direction, and the third candidate position group comprises at least three third candidate positions arranged along the first direction;

(b1) comparing the signal magnitude which is sensed by the sensing element and corresponds to the first candidate position group, the signal magnitude which is sensed by the sensing element and corresponds to the second candidate position group and the signal magnitude which is sensed by the sensing element and corresponds to the third candidate position group; and (c1) determining one of the three first candidate positions which is closest to the sensing element along the first direction as a first actual touching position, determining one of the three second candidate positions which is located between the second candidate position closest to the sensing element and the second candidate position farthest from the sensing element along the first direction as a second actual touching position, and determining one of the three third candidate positions which is farthest from the sensing element along the first direction as a third actual touching position when the signal magnitude corresponding to the first candidate position group is larger than the signal magnitude corresponding to the second candidate position group and the signal magnitude corresponding to the second candidate position group is larger than the signal magnitude corresponding to the third candidate position group.

2. The positioning method according to claim 1, wherein in the step (a), the candidate touching position array further comprises a fourth candidate position group, a fifth candidate position group and a sixth candidate position group, the fourth candidate position group comprises at least three fourth candidate positions arranged along the second direction, the at least three fourth candidate positions comprise one of the first candidate positions, one of the second candidate positions and one of the third candidate positions, the fifth candidate position group comprises at least three fifth candidate positions arranged along the second direction, the at least three fifth candidate positions comprise another first candidate position, another second candidate position and another third candidate position, the sixth candidate position group comprises at least three sixth candidate positions along the second direction, the at least three sixth candidate positions comprise the other first candidate position, the other second candidate position and the other third candidate position, the first direction is substantially perpendicular to the second direction, and after the step (a), the method further comprises:

(b2) comparing the signal magnitude which is sensed by the sensing element and corresponds to the fourth candidate position group, the signal magnitude which is sensed by the sensing element and corresponds to the fifth candidate position group, and the signal magnitude which is sensed by the sensing element and corresponds to the sixth candidate position group; and (c2) determining one of the three fourth candidate positions which is closest to the sensing element along the second direction as one of the first actual touching position, the second actual touching position and the third actual touching position, determining one of the three fifth candidate positions which is located between the fourth candidate position closest to the sensing element and the fourth candidate position farthest from the sensing element along the second direction as another one of the first actual touching position, the second actual touching position and the third actual touching position, and determining one of the three sixth candidate positions which is farthest from the sensing element along the second direction as the other one of the first actual touching position, the second actual touching position and the third actual touching position when the signal magnitude corresponding to the fourth candidate position group is larger than the signal magnitude corresponding to the fifth candidate position group and the signal magnitude corresponding to the fifth candidate position group is larger than the signal magnitude corresponding to the sixth candidate position group, so as to reconfirm the results obtained in the step (c1).

3. The positioning method according to claim 1, wherein in the step (a), the sensing element senses the signal corresponding to the first candidate position group through the first capacitive sensor pads arranged in the same row;

wherein of the first capacitive sensor pads arranged in the same row along the first direction, the equivalent resistance of the first capacitive sensor pad closer to the sensing element is smaller than the equivalent resistance of the first capacitive sensor pad farther from the sensing element.

4. The positioning method according to claim 1, wherein the capacitive touch panel further has a plurality of connectors connected between two adjacent first capacitive sensor pads, in the step (a), the sensing element senses the signal corresponding to the first candidate position group through the first capacitive sensor pads and the connectors arranged in the same row;

wherein of the connectors arranged in the same row along the first direction, the equivalent resistance of the connector closer to the sensing element is smaller than the equivalent resistance of the connector farther from the sensing element.

5. The positioning method according to claim 1, wherein the capacitive touch panel has a first edge and a second edge substantially perpendicular to the first edge, the first edge is substantially perpendicular to the first direction, the second edge is substantially perpendicular to the second direction, in the step (c1), the distance between each of the three first candidate positions and the sensing element is determined according to the distance between each of the three first candidate positions and the first edge in the first direction, the distance between each of the three second candidate positions and the sensing element is determined according to the distance between each of the three second candidate positions and the first edge in the first direction, and the distance between each of the three third candidate positions and the sensing element is determined according to the distance between each of the three third candidate positions and the first edge in the first direction.

* * * * *